United States Patent [19]

Wild

[11] Patent Number: 5,790,180

[45] Date of Patent: Aug. 4, 1998

[54] VIDEO TELEPHONE CALL HANDLING SYSTEM AND METHOD

[75] Inventor: Ronald Lee Wild, Carmel, Ind.

[73] Assignee: AT&T Corp., Middletown, N.J.

[21] Appl. No.: 579,709

[22] Filed: Dec. 28, 1995

[51] Int. Cl.⁶ .................................................. H04N 7/14
[52] U.S. Cl. ............................ 348/16; 348/12; 348/13; 348/14; 455/6.3
[58] Field of Search ......................... 348/14, 13, 15, 348/16, 17, 12; 455/3.1, 5.1, 6.3; 379/96, 94, 93, 202, 204, 205, 93.17, 93.21, 90.01, 93.14

[56] References Cited

U.S. PATENT DOCUMENTS

| | | |
|---|---|---|
| 4,450,481 | 5/1984 | Dickinson . |
| 4,560,833 | 12/1985 | Weber et al. ............... 348/14 |
| 4,910,791 | 3/1990 | Dickinson et al. . |
| 5,014,309 | 5/1991 | West, Jr. . |
| 5,138,649 | 8/1992 | Krisbergh et al. ............... 348/13 |
| 5,329,308 | 7/1994 | Binns et al. ............... 348/14 |
| 5,343,240 | 8/1994 | Yu ............... 348/14 |
| 5,379,421 | 1/1995 | Palazzi, III et al. ............... 348/13 |
| 5,440,335 | 8/1995 | Beveridge ............... 348/13 |
| 5,512,935 | 4/1996 | Majeti et al. ............... 348/12 |
| 5,574,779 | 11/1996 | Ely et al. ............... 348/16 |
| 5,592,540 | 1/1997 | Beveridge ............... 348/16 |

*Primary Examiner*—Stella Woo

[57] ABSTRACT

A system and method for providing video telephone call capabilities through a combination of standard audio telephone lines and video cable TV lines. A person at a video telephone may place a call to a person who does not have a video telephone but who does have cable television service. The system transmits the audio portion of the conversation over standard telephone lines in the manner of a conventional, non-video telephone call. The video portion of the conversation, on the other hand, is concurrently transmitted over in-place cable television equipment to be viewed on the call recipient's television. Alternately, protocol conversion may be utilized in the telephone network to allow a caller and a recipient each having respectively incompatible video telephone equipment to freely communicate with one another.

21 Claims, 5 Drawing Sheets

VIDEO TELEPHONE CALL HANDLING SYSTEM AND METHOD

BACKGROUND OF THE INVENTION

1. Field of the Invention

The present invention is directed to video telephone call handling systems and methods, and specifically to the provision of video telephone call capabilities through a combination of standard audio telephone lines and video cable TV lines.

2. Description of the Related Art

The technology available for placing video telephone calls, i.e. a telephone call in which the audio portion of the conversation is transmitted over a telephone network along with video images of the conversants, has been available for many years. Presently known systems require each caller to have a specially equipped video telephone to provide the transmission and reception of both the video and audio portions of the phone call.

Alternatively, the deployment of public video telephones has begun. While this eliminates the need for callers to invest in any special video telephone apparatus in the home, it requires the caller and/or the call recipient to travel to a public video phone location. This reduces the attractiveness of this option and also eliminates any attempt at spontaneity in the placing and receiving of video telephone calls.

Other, personal computer-based equipment has also been developed, but this technology similarly requires that the video telephone caller and call recipient both have like apparatus at their respective locations. Further, each of the above noted techniques utilizes different underlying communication protocols, thereby rendering one form of video telephone apparatus incompatible with another. This lack of standardization, and the necessity for both parties to own special, heretofore expensive equipment, further inhibits the widespread growth of this technology.

It would therefore be desirable to provide a way for a person possessing video telephone equipment to freely place a video telephone call to a party who does not have such equipment, or who has incompatible equipment.

SUMMARY OF THE INVENTION

The present invention is directed to overcoming the above identified shortcomings of the prior art. Broadly speaking, the invention provides a system whereby a person at a video telephone may place a call to a person who does not have a video telephone. The system transmits the audio portion of the conversation over standard telephone lines in the manner of a conventional, non-video telephone call. The video portion of the conversation, on the other hand, is transmitted over in-place cable television (CATV) equipment to be viewed on the call recipient's television.

The inventive system utilizes apparatus connected to the in-place telephone and cable TV networks and which permits the video transmission to take place over a specially assigned, otherwise interdicted cable TV channel. The call recipient simply tunes to the assigned cable TV channel to view the video portion of the call on their television while carrying on the audio portion of the conversation using their standard telephone instrument. Thus, a one way video call may be placed without the need for the call recipient to have any special video telephone equipment.

In use, a person utilizing a video telephone terminal, public video telephone or other video telephone apparatus initiates a call to a centralized video call transfer center. Equipment connected to the transfer center determines the availability of a cable TV channel at the call recipient's location and passes information concerning the call to the recipient's cable TV company head end to prepare for the transmission of the video portion of the call over an otherwise interdicted cable channel receivable at the recipient's location. A specialized video telephone unit—in place as part of the CATV or telephone switching network—splits the video portion of the call from the audio portion. The audio is routed in a conventional, traditional manner over the telephone network to the recipient's telephone. Upon connection, the caller—or a synthesized voice under the control of the transfer center—may advise the call recipient to tune the recipient's television to the assigned cable channel. The video portion of the telephone call is then transmitted through the video telephone unit and through the cable company head end over the formerly interdicted cable TV channel assigned during call setup. The call recipient, having tuned their television to the cable channel assigned, is then able to view the video portion of the call on their television while carrying on the audio portion of the call in a traditional manner using the standard telephone.

Thus, in accordance with the invention, a video call can be placed by a video telephone user to any person having a phone and who also subscribes to cable television service. Additionally, the same technique can be used for one way video conferencing, whereby a single video telephone caller would call multiple cable television subscribers so that multiple recipients could simultaneously view the video image and hear the audio produced by the video conference call initiator. Such a system is particularly advantageous for remote business meetings or remote education. In short, one way video conferencing services can thereby be made available to a wide base of potential call recipients with no investment in equipment on the recipient's part.

Additionally, the system of the invention may be utilized by two parties with non-compatible video equipment to enable the placement of two-way video calls. In such a situation a first caller places a video telephone call in the above-described manner. The recipient then initiates a second call, over a second phone line, transmitting the video portion of that second call to the first caller's cable television. Both caller and recipient are then able to view the video portion of the call over their respective cable televisions.

Alternately, the video telephone unit may be equipped with protocol conversion capabilities to eliminate the need for separate audio and video communication paths altogether.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING FIGURES

In the drawings, which are illustrative and not to scale, and wherein like reference characters denote similar elements throughout the several views.

DETAILED DESCRIPTION OF THE PREFERRED EMBODIMENTS

Figure 1:
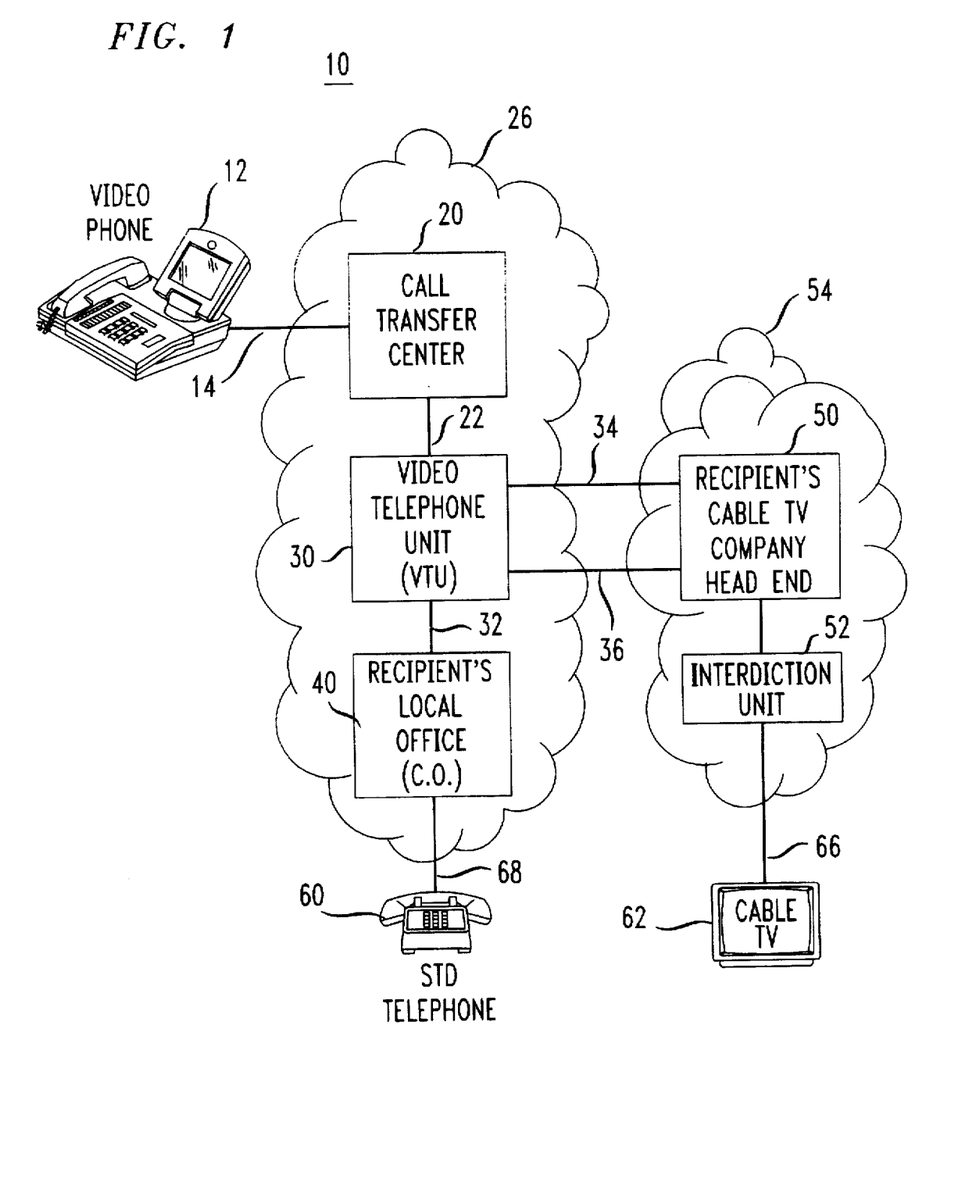
FIG. 1 is a schematic block diagram of the major components of the system of the instant invention.

FIG. 1, depicts a preferred embodiment of a video telephone call system 10 constructed in accordance with the present invention. The system 10 permits a video telephone call originated at a caller's video telephone equipment 12 to be transmitted to a recipient's standard telephone instrument 60 and cable television 62. Cable television 62 typically includes a monitor for displaying video images and a tuner for selectively tuning in one of a number of available television channels. As used herein the terms "video telephone equipment" and/or "video phone" are used synonymously and are intended to mean any apparatus capable of transmitting simultaneous audio and video signals over a communications network, such as, by way of non-limiting example, an AT&T Picturephone or equivalent, or a personal computer utilizing a video camera and software, such as Intel's ProShare Personal Conferencing or equivalent. The term "signal" as used herein is intended to denote an analog or digital signal in electrical, electromagnetic or optical form.

A caller using the system 10 calls a special telephone number to initiate a video telephone call on video phone 12, which is carried over the caller's telephone line 14 to a centralized call transfer center 20, discussed in greater detail hereinbelow. The call transfer center 20 obtains the recipient's phone number and establishes communication through telephone network 26 with a video telephone unit (VTU) 30 over a video telephone line 22. The VTU 30, also discussed in greater detail below, comprises hardware, software and/or firmware for handling multiple video calls over multiple audio/video channels, and is preferably located in and forms a part of the telephone network.

The VTU 30 has associated with it a number of video telephone lines 22 each dedicated to a cable TV channel. The call transfer center maintains the status of each video telephone line 22 and thus knows which lines, and thus which cable TV channels, are available at the recipient's location. Once connected to the call transfer center 20, the VTU 30 causes a channel interdiction unit 52 located in and forming a part of the cable TV network to clear any channel interdiction on the assigned channel so as to permit its reception at the call recipient's cable TV 62. The caller is then instructed by the call transfer center 20 as to the cable TV channel that should be tuned in by the recipient. For call privacy, the video portion of the call is transmitted to the recipient's cable TV in such a manner as to only be viewable by-the recipient at the recipient's cable TV. Such privacy may be achieved using commonly known CATV interdiction techniques, or by scrambling, or other encryption methods addressable either at the level of the individual recipient's cable TV, or at the CATV head end, or elsewhere in the CATV distribution system. As used herein the term "interdiction" and/or "interdicted" is intended to mean all techniques for selectively permitting or prohibiting reception of a particular video signal at a particular cable service subscriber location.

The VTU 30 which receives the call separates the audio and video signal components of the call. The audio portion of the call is sent through the telephone network 26 over a network phone line 32 to the recipient's telephone service, typically through recipient's local telephone central office (CO) 40 for connection through the recipient's telephone line 68 to the recipient's standard telephone set 60. Once so connected, the caller instructs the recipient to tune to the assigned cable TV channel for concurrent viewing of the video portion of the call. As used herein the term "telephone service" is intended to denote any entity or company or combination of multiple entities or companies providing telecommunications services to the caller and or/recipient.

The video portion of the call, separated at VTU 30, is sent over video transmission line 34 to the cable TV head end 50 of the call recipient's cable service company for further transmission over the cable TV (CATV) distribution system 54 to the recipient's individual cable TV line 66 for reception and viewing on the recipient's cable TV 62.

As used herein the term "cable television service" is intended to denote any entity or company or combination of multiple entities or companies providing cable TV services to the caller and or/recipient. As used herein, the terms "cable TV" "cable television" and/or "CATV" are used synonymously and are intended to include all forms of subscription TV employing interdiction, regardless of the delivery media, as opposed to free, over-the-air broadcast television, and specifically include, by way of non-limiting example, subscription and pay-per-view cable TV services, over-the-air subscription TV, satellite systems, and the like. Thus the use of term "cable" is merely illustrative and is intended to include all TV delivery media such as, by way of non-limiting example, coaxial cable, twinlead, fiber optic strands, waveguide, satellite antenna and other wireless forms of signal delivery.

Additionally, as used herein, the terms "telephone network" and "communications network" are intended to encompass any and all means for carrying standard audio-only and/or video telephone calls from one location to another, whether inter-LATA, intra-LATA, within a private network or CO, wired or wireless. The depicted or described use of any one particular signal path such, for example, as phone lines 14, 22, 32, 68, 114, and 122 is purely illustrative, it being recognized that call completion through a network may span multiple signal paths, over multiple signal carrying media, through multiple network nodes, and that all such routing is well within the skill of the telephone network designer.

The Call Transfer Center

Figure 2:
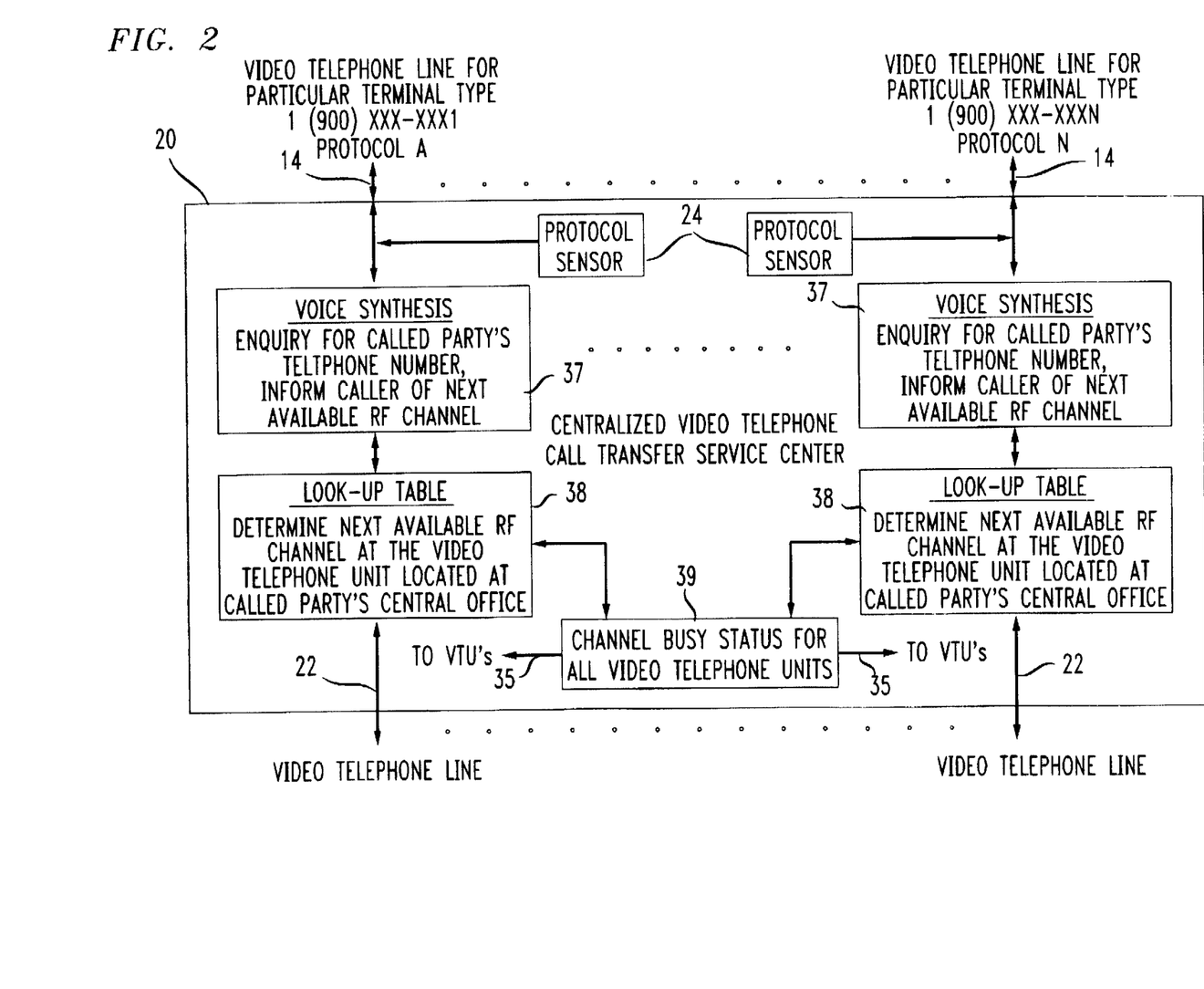
FIG. 2 is a schematic block diagram of the call transfer center component of the instant invention.

The call transfer center 20, as mentioned above, is the first point in the system to receive the video call placed by a caller. As seen in FIG. 2, the transfer center 20 includes equipment for handling multiple incoming video calls over multiple video telephone lines 14. The transfer center 20 is preferably reached by dialing a special telephone number advertised by the company providing the video call system 10. The transfer center number may be, for example, a "1-900" number so that premium billing may be automatically associated with the call. Additionally, to facilitate the ready handling of incoming calls utilizing different video protocols, the transfer center 20 may be reached by a series of different phone numbers depending on the type of video telephone equipment owned by the caller. Thus, for example, AT&T Picturephone owners might dial 1-900-ATT-VID1, while ProShare owners might dial 1-900-PRO-SHAR, etc. Alternately, a single number may be advertised and the specific video protocol used by the caller's video telephone 12 may be determined through prompted user input or automatically by using a video protocol sensor 24 installed at the transfer center 20. The detection of video protocols by protocol sensor 24 can be readily achieved using hardware and software techniques known in the art.

In any event, the transfer center 20 receives the video call over phone line 14 and, either through a voice synthesis unit 37 or through a live operator (not shown), ascertains from the caller the telephone number of the intended call recipient. As used herein the term "voice synthesis" is intended to include computer synthesised text-to-speech and/or speech-to-text, as well as touch tone speech response systems utilizing pre-recorded messages or message fragments, or their art-recognized equivalents. The capture of the call recipient's telephone number by voice synthesis or touch tone speech response may be performed by hardware and software well known in the art and which does not therefore require a detailed description herein. The use of a live operator is a less-preferred alternative.

After ascertaining the intended call recipient's telephone number, the transfer center 20 then establishes communication via the telephone network 26, by dialing a telephone number associated with video telephone line 22 which is connected to the VTU 30 which serves the call recipient's local telephone and cable system. The routing and establishment of communication between the transfer center 20 and the proper VTU 30 associated with the recipient's location is preferably performed by hardware and software in the telephone network, the design and implementation of which is readily within the mechanical skill of the telephone network routineer. The use of video telephone line 22 is purely exemplary.

To determine whether the VTU 30 has an available audio/video channel over which to complete the call, transfer center 20 utilizes a VTU channel status unit 39 and look-up table 38. As mentioned above, each video telephone line 22 represents a channel 33 in VTU 30 as well as a cable TV channel. Transfer center 20 maintains the status of each video telephone line 22 it has dialed in channel status unit 39. In this manner the transfer center 20 knows whether a video telephone line is available to complete the call, and also which cable TV channel will be used. Alternatively, if the cable TV channel assignment is dynamic, the channel status unit 39 may contain hardware and software for performing continuous periodic status queries of the multiple audio/video channels of VTU 30, described in greater detail below. This query may take place via video telephone line 22, or through an independent VTU status line 35, as a matter of design choice, utilizing known line status detecting techniques. In any event, information regarding VTU channel status is maintained in a VTU channel look-up table 38 at transfer center 20. Look-up table 38 may be implemented utilizing any number of widely available database and/or software design tools.

If look-up table 38 indicates that an audio/video channel 33 in VTU 30 is available, that channel is selected to be utilized for carrying the video call, the telephone number of the corresponding video telephone line 22 is dialed by the transfer center 20, and the transfer center 20 advises the caller and/or recipient of the cable TV channel that will carry the video portion of the call, either by voice synthesis unit 37 or by a live operator if used.

Alternatively, the VTU 30 may query the cable TV head end 50 over data line 36 for an available CATV channel at the call recipient's location. The CATV channel assignment information obtained at head end 50 is passed by the VTU 30 to the transfer center 20 and relayed to the caller and/or recipient by voice synthesis unit 37 or, alternatively, by a live operator if used. The recipient may then tune to the assigned CATV channel as described above.

The Video Telephone Unit (VTU)

Figure 3:
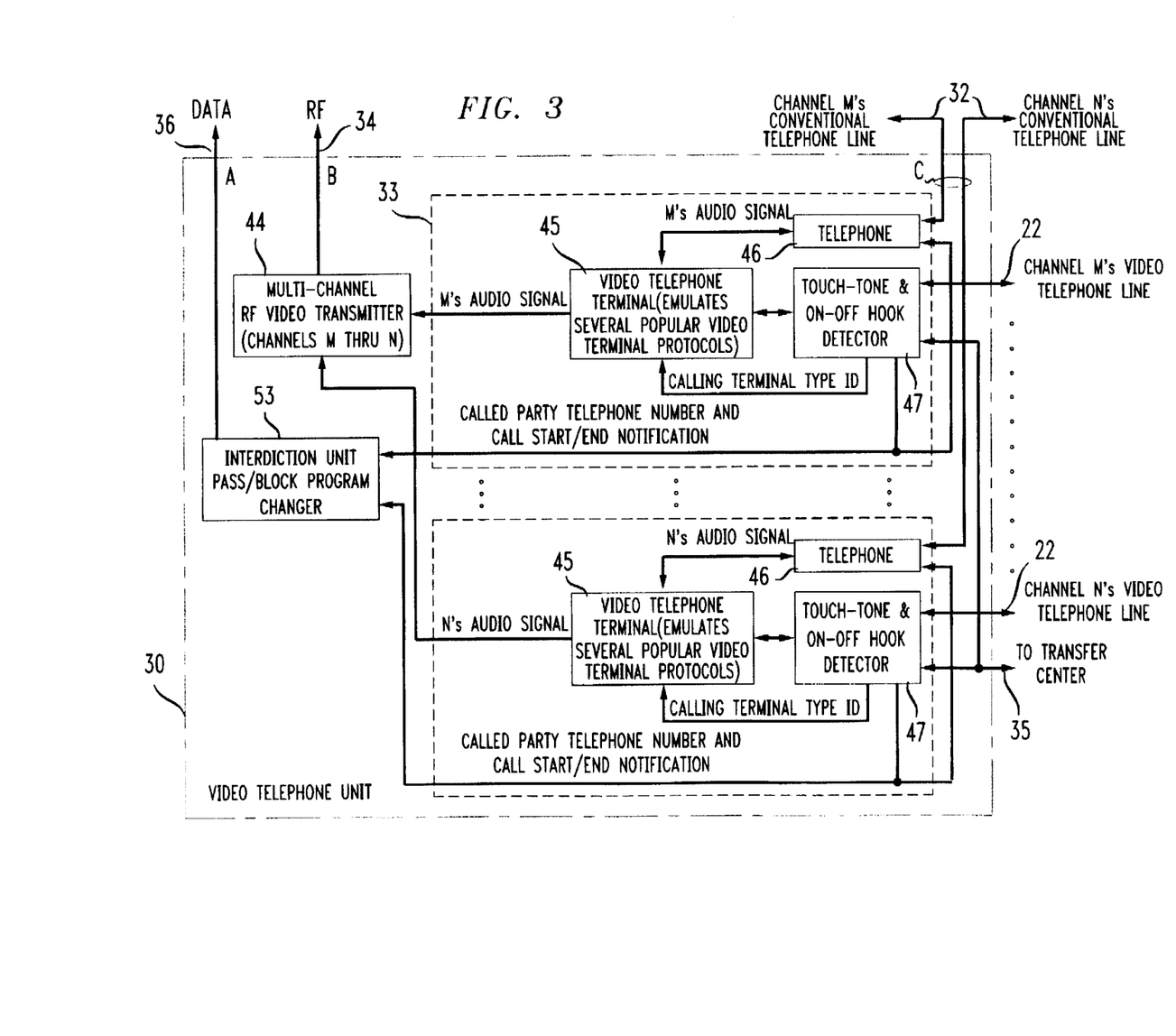
FIG. 3 is a schematic block diagram of the video telephone unit component of the instant invention.

VTU 30 provides multiple audio/video channels for handling multiple simultaneous video telephone calls. With reference to FIG. 3, an exemplary VTU 30 is depicted having multiple audio/video channels M through N, a typical audio/video channel being designated by the reference numeral 33. Each of the audio/video channels 33 in a VTU contains similar components and operates in a similar fashion. The number of VTUs required to handle the anticipated video call volume over the network is a matter of design choice within the skill of the telephone network traffic designer.

A touch tone and off-hook detector 47 is connected to each incoming video telephone line 22. Detector 47 provides the channel availability information utilized by VTU channel status unit 39 by simulating a line busy condition (off-hook) or line available condition (on-hook) on video telephone line 22. As mentioned above, the transfer center 20 knows which video telephone lines 22 it has dialed and thus which VTU channel 33 is available for use. Alternatively, channel status information may be dynamically passed to the transfer center 20 through video telephone line 22 or via VTU status line 35. When an on-hook VTU channel is identified, a connection is made between that VTU channel and the transfer center 20 by the transfer center 20 dialing the telephone number associated with that channel's video telephone line 22. Once the call is established, the detector 47 changes its status to off-hook.

With reference to FIGS. 1 and 3, and as mentioned above, each VTU 30 contains a number of channels 33, indicated as channels M through N, having a dedicated video telephone line 22 reached by a dedicated telephone number. Each VTU channel 33 is also dedicated to a particular cable TV channel at the cable TV head end 50. The cable TV service allocates to each VTU a number of cable TV channels equal to the number of channels 33 in that VTU. Those cable TV channels are then managed by the VTU 30. When a call reaches the transfer center 20, it seeks the next available (not busy) VTU channel 33 for connection. The available VTU channel then is connected to transfer center 20 via that channel's video telephone line 22, and its status changes to busy (off hook). The call is then split into audio and video components, as discussed below. The video is then transmitted over one channel of multi-channel transmitter 44 at the frequency at which it is broadcast by the cable TV service. Interdiction program changer 53 then directly removes, or instructs the cable TV head end 50 to remove, any interdiction present on that cable TV channel at the recipient's dwelling, to ensure privacy. Interdiction program changer 53 reactivates the channel interdiction when the call is completed, i.e. when the VTU channel 33 carrying the call goes back to on-hook status.

Alternatively, if channel assignment is done dynamically, detector 47 receives the call recipient's telephone number from transfer center 20 and, based on this number, locates and queries the recipient's cable TV head end 50 for an available TV channel at the recipient's home. This query is passed through data line 36 and interdiction program changer 53, and the assigned cable channel is passed back through this same path to the transfer center for delivery to the caller through the transfer center 20 as described above. The interdiction program changer passes a signal over data line 36 to cable TV head end 50 instructing head end 50 to remove any channel interdiction existing on the assigned cable channel at the recipient's dwelling. This interdiction removal signal is routed through the cable TV head end 50 through the CATV distribution system 54 to the interdiction unit 52 in place in the recipient's CATV system in much the same manner that conventional pay-per-view programming is delivered today. It will be recognized that the particular interdiction scheme used will vary from cable system to cable system and, therefore, that the specific implementation of the particular interdiction removal methodology employed is a system-specific matter of design choice.

Referring once again to FIG. 3, the video telephone call is received over video telephone line 22 and the audio and video signal components of the call are fed to a video terminal emulator 45 which, based upon the protocol detected by and passed from the transfer center 20, emulates a video telephone of the same type as the caller's video telephone 12. Emulator 45 also splits the audio and video signal components for separate routing to the recipient's home. The audio signal component is routed through a standard telephone component 46 over a conventional phone line 32 for transmission through the telephone network 26, through the recipient's local central office 40 and over the call recipient's telephone line 68 to the standard telephone set 60 in the recipient's home, in much the same manner as a conventional telephone call. The video signal component, however, is converted to a radio frequency (RF) video signal and sent via one channel of a multi-channel RF video transmitter 44 for transmission over an RF video line 34 to the recipient's cable TV head end 50 and CATV distribution system 54. The RF signal may be in the form of a cable TV channel signal or it may be in an alternate form and converted to a cable channel signal at the head end 50. The video signal is then routed through the recipient's individual cable TV line 66 for delivery to recipient's cable TV 62 over a previously interdicted cable TV channel, in much the same manner as a conventional pay-per-view television program. When the call is terminated, detector 47 once again reverts to on-hook status, and signals program changer 53 to directly reactivate, or if so configured, signals the cable TV head end 50 to reactivate, the channel interdiction on the assigned cable TV channel at the recipient's dwelling. That channel is now free to handle other video telephone calls. It will, of course, be recognized that the video signal component may be converted to any art-recognized, transmittable signal form other than RF, as dictated by the design criteria of the network and the capabilities and requirements of the CATV head end.

Detector 47, emulator 45 and program changer 53 may be implemented in hardware, software and/or firmware, as a general matter of design choice, each implementation being well within the normal ability of one skilled in the art of telephony and CATV component design. Popular emulation schemes resident in emulator 45 may be, by way of non-limiting example, International Telecommunications Union 320Y and/or International Telecommunications Union H.320, utilizing basic rate and/or primary rate interfaces. Telephone component 46 is a hardware and/or firmware component which functions as a network-based standard telephone set.

Design Alternatives

Figure 4:
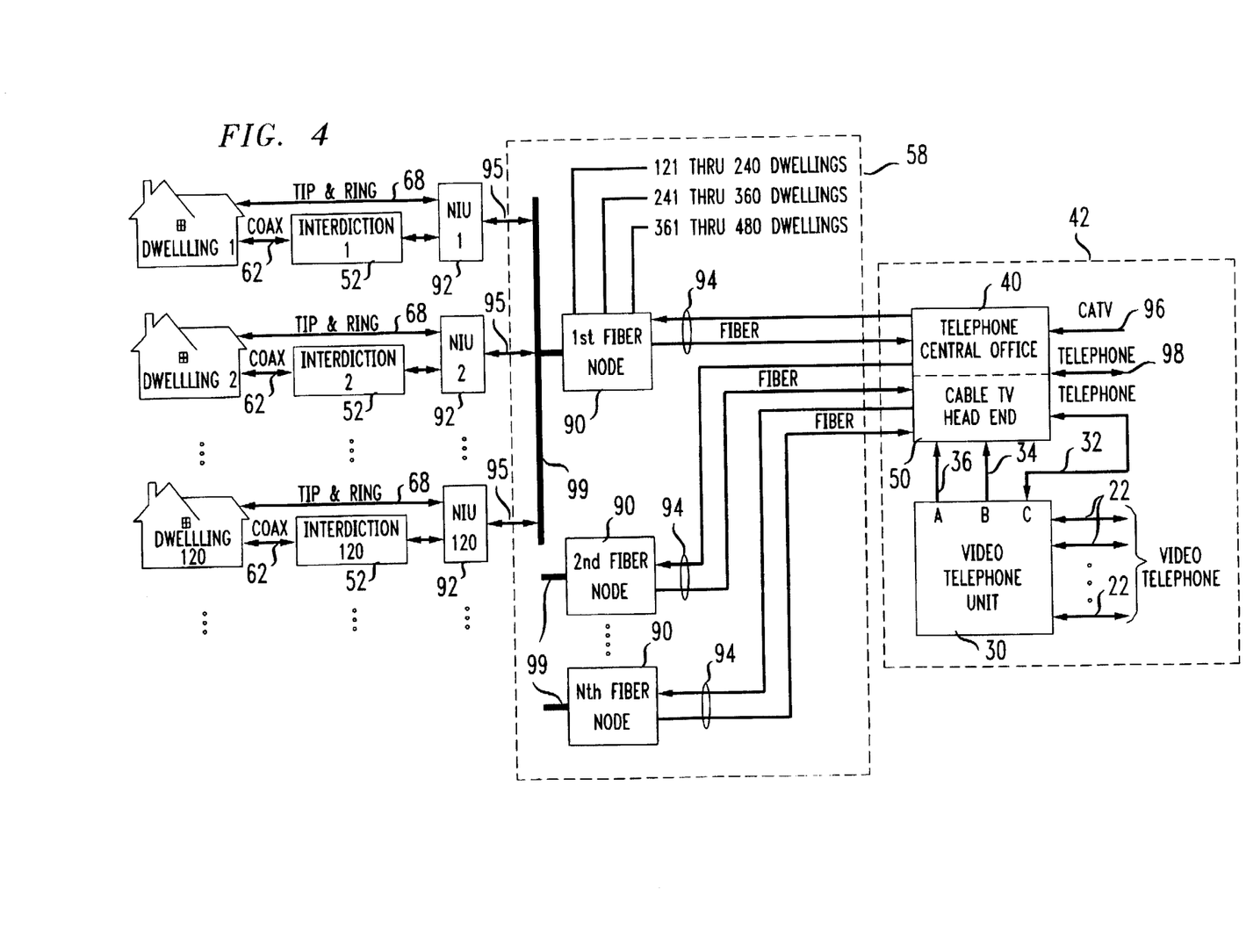
FIG. 4 is a schematic block diagram depicting a currently preferred network topology.

A presently preferred system topology is illustrated in FIG. 4 which depicts the system 10 implemented as part of the AT&T HFC 2000 network in which telephone switching and cable TV components share facilities and distribution media. In this configuration, a combined telephone central office and cable TV head end 42, hereinafter referred to as "combined CO 42," houses many of the major system components discussed above.

Specifically, the telephone CO 40, cable TV head end 50, and VTU 30 are all co-located in combined CO 42. Standard CATV source programming is received over CATV lines 96, and standard voice telephone calls are received over phone lines 98. Video calls, however, are received over video telephone lines 22 from a call transfer center 20 which may or may not be co-located in combined CO 42. Routing of the video and audio portions of a video call to the recipient is greatly simplified, since the VTU 30 already "knows" that when a video call is received it is destined for a recipient connected to the common telephone and CATV distribution network 58 originating from combined CO 42.

Distribution network 58 contains a series of fiber nodes 90 connected to combined CO 42 via fiber optic cables 94. Fiber optic cables 94 are bidirectional signal carrying media, and may be implemented as dual strand or single strand fiber cables as a matter of design choice. Both the audio and video signal components separated by VTU 30 and passed through cable TV head end 50 and telephone CO 40 are carried by fiber cables 94 to fiber nodes 90, from which they are further distributed to a series of telephone and cable distribution busses 99. Distribution busses 99 may be coax, fiber or wireless, as desired. Fanning out from the busses 99 are a series of network interface units (NIUs) 92 connected via coax cables 95. The NIUs 92 receive the audio and video signal components of the call over coax cables 95 and route the audio over the recipient's standard tip and ring telephone line 68, while routing the video over the recipient's coax line 62. Interdiction unit 52 may be in-place on the coax line 62 as shown, or may be part of a set-top cable box or the cable TV head end 50, or be located elsewhere in the cable distribution system (not shown), provided that it is responsive to the signals from program changer 53 and/or cable TV head end 50 for selectively removing any interdiction from the assigned cable channel at the recipient's dwelling over which the video portion of the call will travel.

It will of course be recognized that many variations may be made in the distribution schemes described above without departing from the spirit of the invention. For example, the entire distribution system 58 may be coax, fiber or wireless, or a combination of the three different from that illustrated and described herein. Alternately, the recipient may receive the call entirely over the cable TV network through local telephone company bypass schemes currently available, thereby eliminating the need for the recipient's local telephone company to be involved in the routing of the call once it reaches the cable TV head end.

Further, the components of the system may be deployed at any location in the network distribution topology as a matter of design choice. Thus the transfer center 20, VTU 30, telephone CO 40, cable TV head end 50 and interdiction unit 52 may all be independently located, all co-located, or some combination thereof. Interconnection of the components to achieve the functionality described above may be through direct or switched connections, over shared or independent networks, provided that the audio and video signals recombine at the recipient's premises for simultaneous hearing and viewing.

Figure 5:
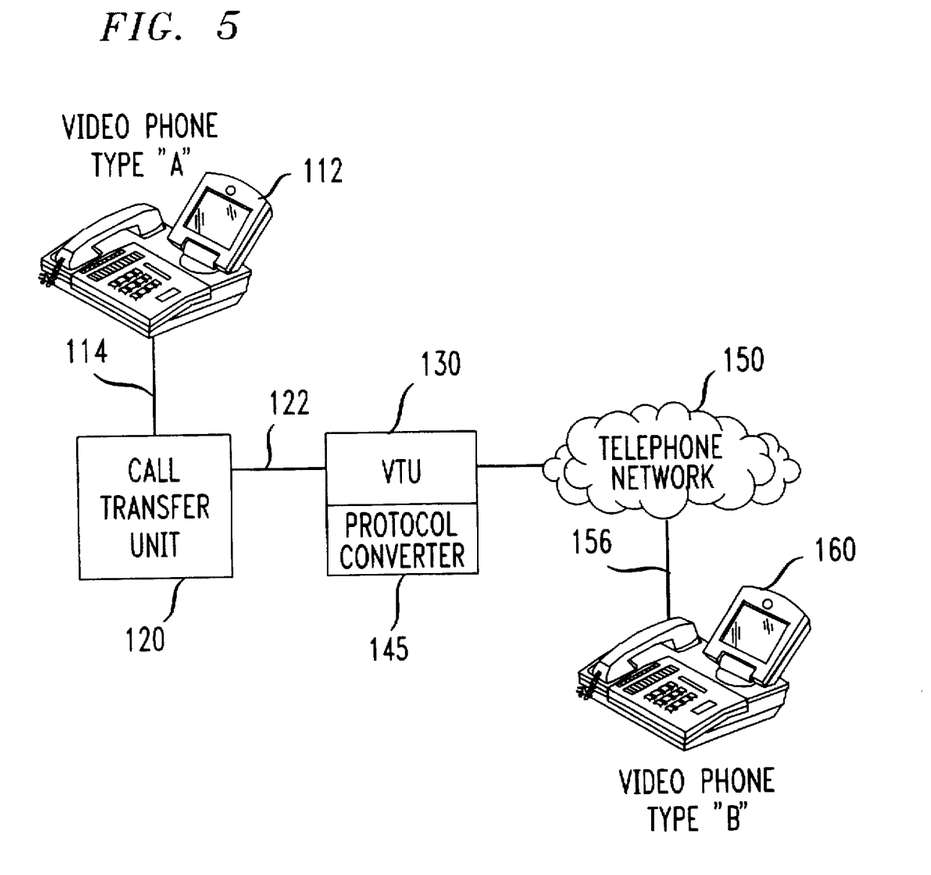
FIG. 5 is a schematic block diagram of an alternate embodiment of the invention.

Additionally, it may be possible to eliminate the cable distribution network portion entirely and provide full bidirectional video call capabilities. Referring now to FIG. 5, there is shown another embodiment of the invention wherein a caller (not shown) having video phone 112 utilizing protocol type 'a' wishes to communicate with a call recipient (not shown) owning an incompatible video phone 160 which utilizes protocol type 'b.' In this case the caller would call a transfer unit 120, similar in operation to transfer unit 20 described above, over the caller's phone line 114. Transfer unit 120 will route the call over video telephone line 122 to a VTU 130. VTU 130 contains a bidirectional protocol emulator 145 capable of performing bidirectional protocol conversion between protocol type 'a' and protocol type 'b.' The VTU 130 will route the call over telephone network 150 and through phone line 156 to the recipient's video phone 160, and the video call will thus take place as if both caller and recipient had compatible video phones. Since the protocol conversion is performed at the VTU, no separation of the audio and video signal components is required, and thus no separate video distribution scheme is necessary. The protocol conversion may be carried out in hardware, software and/or firmware, as a matter of design choice, by one skilled in the art. As mentioned above, the specific location of the transfer unit 120, VTU 130 and/or the protocol converter in the network is also a matter of design choice, as are the particular interconnection schemes employed within the network.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A system for carrying a video telephone call between a caller at a first location having video telephone equipment and a recipient at a second location having telephone service including a telephone and cable television service including a television tuner and a monitor, the system comprising:

means located remote from the second location for separating said video telephone call from said caller into an audio signal component and a video signal component;

means for transmitting from said separating means said audio signal component of said call for reception by said recipient's telephone service so as to enable reception of said audio signal component at said recipient's telephone at the second location; and means for transmitting from said separating means said video signal component of said call for reception by said recipient's cable television service so as to enable reception and viewing of said video signal component at said recipient's cable television monitor at the second location through said tuner over a cable television channel;

said separating means being located in and forming a part of a communications network, said communications network comprising means for routing said video telephone call to said separating means, means for routing said transmitted audio signal component to said recipient's telephone service, and means for routing said transmitted video signal to said recipient's cable television service.

2. The system of claim 1, further comprising means for determining the call recipient's telephone number, said communications network performing said routing based upon said determined telephone number.

3. The system of claim 2, further comprising means for maintaining information regarding the availability of a cable television channel capable of being received at said recipient's television monitor through said tuner, and means for communicating said available channel to one of said caller and said recipient so that said recipient may be instructed to tune in said channel on said tuner for viewing on said monitor.

4. The system of claim 3, wherein said means for communicating said available channel is selected from a group of means consisting of a voice synthesis unit, a touch tone speech response unit, and a live operator.

5. The system of claim 1, wherein said video telephone call has a duration and said cable television channel is an interdicted television channel, and wherein said system further comprises means for communicating with said recipient's cable television service to remove said interdiction for said call duration.

6. The system of claim 1, wherein said video telephone call has a duration and said available cable television channel is an interdicted cable television channel, and wherein said separating means further comprises means for removing said interdiction from said cable television channel for said call duration.

7. The system of claim 1, wherein said video signal transmitting means comprises a radio frequency video transmitter.

8. An apparatus for facilitating a video telephone call between a caller at a first location having video telephone equipment and a recipient at a second location having telephone service and a telephone and cable television service and a television tuner and a monitor, the apparatus comprising:

means for receiving a signal containing audio and video signal components from the caller's video telephone equipment at the first location;

means, connected to said receiving means and located remote from the second location, for separating said audio and video signal components of the signal from the caller's video telephone equipment into an audio signal and a video signal;

means, connected to said separation means, for transmitting said audio signal from said separating means to said recipient's telephone service for reception of said audio signal by said recipient's telephone at the second location; and means, connected to said separation means, for transmitting said video signal from said separating means to said recipient's cable television service for reception of said video signal by said recipient's cable television monitor at the second location through said tuner over a cable television channel;

said separating means being located in and forming a part of a communications network, said communications network comprising means for routing said video telephone call to said separating means, means for routing said transmitted audio signal component to said recipient's telephone service, and means for routing said transmitted video signal to said recipient's cable television service.

9. The apparatus according to claim 8, wherein said means for transmitting said audio signal comprises means for emulating a standard telephone set.

10. The apparatus of claim 8, wherein said means for transmitting said video signal comprises a radio frequency video transmitter.

11. The apparatus of claim 10, wherein said separating means comprises means for converting said video signal component of said video telephone call into a radio frequency video signal.

12. The apparatus of claim 8, further comprising means for detecting the start and the end of said video telephone call to determine a call duration, and means, responsive to said duration detecting means, for causing any interdiction present on said cable television channel to be removed for said call duration.

13. A method of carrying a video telephone call between a caller at a first location having video telephone equipment and a recipient at a second location having telephone service and a telephone and cable television service and a cable television tuner and monitor, the method comprising the steps of:

separating, at a location remote from the second location and located in and forming a part of a communications network, the video telephone call from the caller at the first location into an audio signal component and a video signal component;

transmitting the separated audio signal component of the call from the remote location for receipt of the separated audio signal by the recipient's telephone at the second location; and transmitting the separated video signal component of the call from the remote location for receipt by the recipient's cable television tuner and monitor at the second location for viewing of the separated video signal thereon;

the communications network comprising means for routing the video telephone call to a separation means, means for routing the separated audio signal component to the recipient's telephone service, and means for routing the separated video signal to the recipient's cable television service.

14. The method of claim 13, further comprising the steps of:

routing said video telephone call to means capable of carrying out said separating step;

routing said transmitted audio signal component to the recipient's telephone service, and routing said transmitted video signal to the recipient's cable television service.

15. The method of claim 14, further comprising the steps of:

detecting the start and the end of said video telephone call to determine a call duration, and causing any interdiction present on said cable television channel to be removed for said call duration.

16. The method of claim 14, further comprising the steps of:

detecting the start and the end of said video telephone call to determine a call duration, and communicating with said recipient's cable television service to remove any interdiction present on said cable television channel for said call duration.

17. A method of operating a telecommunications network for the handling of video telephone calls, comprising the steps of:

receiving a video telephone call placed by a caller at a first location and intended for a call recipient at a second location having telephone service and a telephone and cable television service and a cable television tuner and a monitor;

separating, at a location remote from the second location and located in and forming a part of a communications network, the video telephone call from the caller at the first location into an audio signal component and a video signal component;

transmitting the separated audio signal component of the call from the remote location to the recipient's telephone service for further transmission of the separated audio signal to the recipient's telephone at the second location; and transmitting the separated video signal component of the call from the remote location to the recipient's cable television service for further transmission of the separated video signal over a cable television channel to the recipient's cable television tuner and monitor at the second location for viewing of the separated video signal thereon;

the communications network comprising means for routing the video telephone call to a separating means, means for routing the separated audio signal component to the recipient's telephone service, and means for routing the separated video signal to the recipient's cable television service.

18. The method of claim 17, further comprising the steps of:

routing said video telephone call to means capable of carrying out said separating step;

routing said transmitted audio signal component to the recipient's telephone service, and routing said transmitted video signal to the recipient's cable television service.

19. The method of claim 18, further comprising the steps of:

detecting the start and the end of said video telephone call to determine a call duration, and causing any interdiction present on said cable television channel to be removed for said call duration.

20. The method of claim 18, further comprising the steps of:

detecting the start and the end of said video telephone call to determine a call duration, and communicating with said recipient's cable television service to remove any interdiction present on said cable television channel for said call duration.

21. A method of operating a telecommunications network for the handling of video telephone calls, comprising the steps of:

receiving, at a location remote from a second location and located in and forming a part of a communications network, a video telephone call placed by a caller at a first location and intended for a call recipient at the second location having a telephone and a television set;

separating, at the remote location, the video telephone call from the caller into an audio signal component and a video signal component;

transmitting, from the remote location, the separated audio signal component of the call to the recipient's telephone at the second location; and transmitting, from the remote location, the separated video signal component of the call to the recipient's television set at the second location;

the communications network comprising means for routing the video telephone call to a separating means, means for routing the separated audio signal component to the recipient's telephone service, and means for routing the separated video signal to the recipient's cable television service.

* * * * *